(12) United States Patent
Larson et al.

(10) Patent No.: US 6,669,204 B2
(45) Date of Patent: Dec. 30, 2003

(54) CYLINDER HEAD GASKET HAVING REINFORCED COMBUSTION SEAL

(75) Inventors: Richard M. Larson, Des Plaines, IL (US); Gregory C. West, Pleasant Prairie, WI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/105,519

(22) Filed: Mar. 25, 2002

(65) Prior Publication Data

US 2003/0178788 A1 Sep. 25, 2003

(51) Int. Cl.$^7$ ................................................. F16J 15/14
(52) U.S. Cl. ........................ 277/590; 277/592; 277/600
(58) Field of Search ................................. 277/592, 591, 277/600, 590

(56) References Cited

U.S. PATENT DOCUMENTS

| | | | |
|---|---|---|---|
| 1,793,423 A | 2/1931 | Fitzgerald | |
| 1,815,601 A | 7/1931 | Victor | |
| 1,903,990 A | 4/1933 | Fitzgerald | |
| 1,974,633 A | 9/1934 | Victor | |
| 2,157,102 A | 5/1939 | Victor et al. | |
| 3,784,212 A | 1/1974 | Doerfling | |
| 4,284,282 A | 8/1981 | Lonne | |
| 4,330,585 A | 5/1982 | Eyrard et al. | |
| 4,434,989 A | * 3/1984 | Beyer et al. | 277/592 |
| 4,468,044 A | 8/1984 | Ulmer et al. | |
| 4,531,750 A | 7/1985 | Herrington | |
| 4,662,643 A | 5/1987 | Rosenquist | |
| 4,711,456 A | 12/1987 | Udagawa | |
| 4,767,124 A | 8/1988 | Udagawa | |
| 4,817,969 A | * 4/1989 | McDowell et al. | 277/595 |
| 5,306,023 A | 4/1994 | Udagawa | |
| 5,772,215 A | 6/1998 | West | |
| 5,873,578 A | * 2/1999 | Jargeaix | 277/601 |

* cited by examiner

*Primary Examiner*—William Miller
(74) *Attorney, Agent, or Firm*—Howard & Howard

(57) ABSTRACT

A gasket body has a combustion opening and a coolant opening close to the combustion opening to define a narrow region of the gasket between the openings. An inner armor layer has an inner C-shaped section folded over an edge of the combustion opening adjacent to the coolant opening. The inner armor layer has top and bottom portions extending over the top and bottom surfaces of the narrow region of the gasket body. An outer armor layer has an outer C-shaped section folded over the inner C-shaped section. The outer armor layer has top and bottom portions extending over the top and bottom portions of the inner armor layer. The bottom portion of the outer armor layer extends across the entire width of the bottom surface of the narrow region of the gasket body and has a second C-shaped section folded up and over an edge of the coolant opening adjacent to the combustion opening.

6 Claims, 1 Drawing Sheet

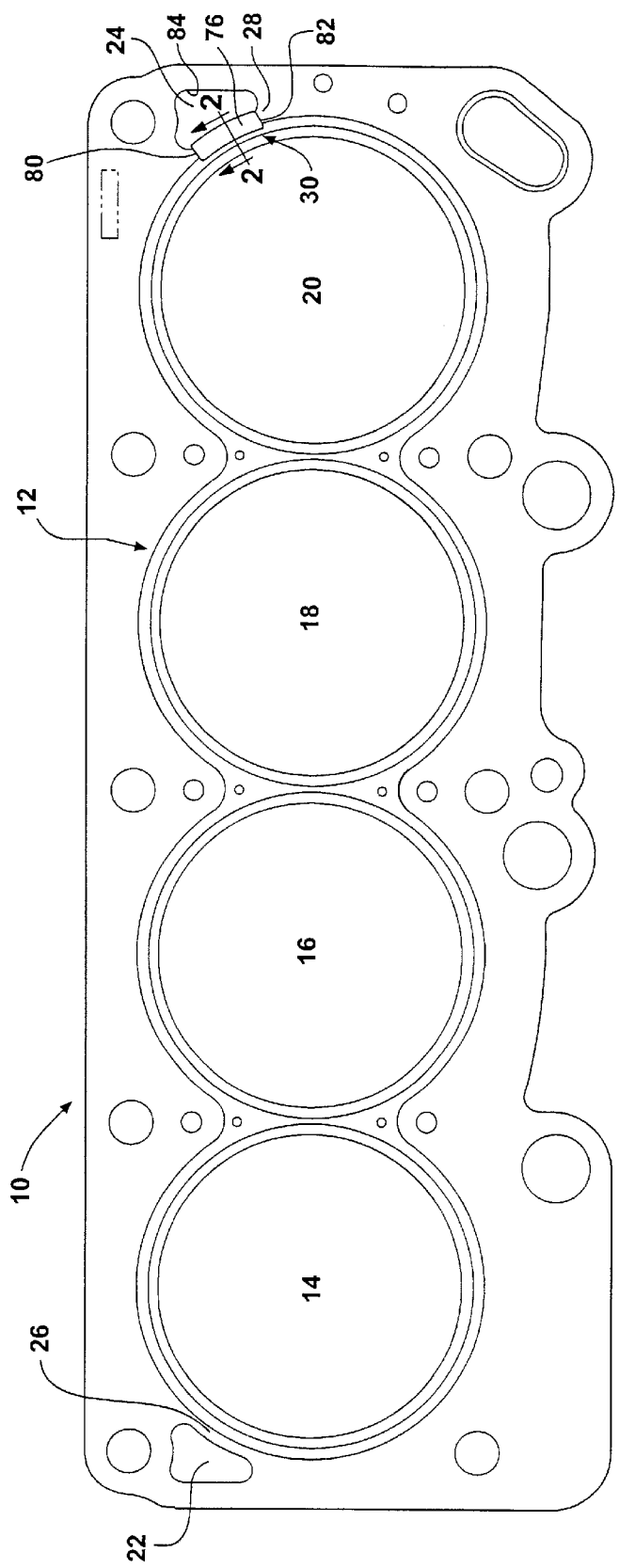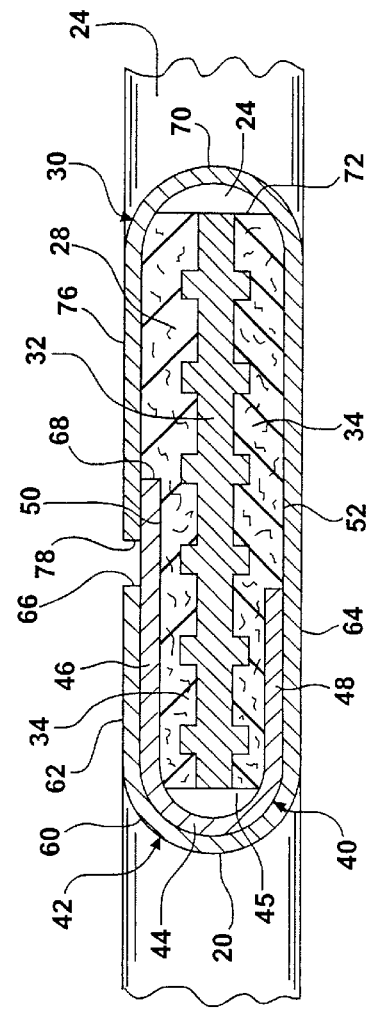

CYLINDER HEAD GASKET HAVING REINFORCED COMBUSTION SEAL

BACKGROUND OF THE INVENTION

1. Technical Field

This invention relates generally to cylinder head gaskets and more particularly to a cylinder head gasket having reinforcement of a coolant opening adjacent to a combustion opening.

2. Related Art

A coolant passage in an engine block is typically located very close to one of the cylinder bores where combustion occurs. The relatively narrow portion of gasket material between a combustion opening and a closely spaced coolant opening in a gasket is prone to failure and is difficult to properly seal.

SUMMARY OF THE INVENTION AND ADVANTAGES

A gasket constructed according to the invention comprises a generally flat gasket body having a combustion opening and a coolant opening adjacent to but closely spaced from the combustion opening to define a narrow region of the gasket body between the openings. The gasket is characterized by including armoring comprising a metallic armor layer having a generally C-shaped section folded over an edge of said coolant opening adjacent to the combustion opening.

The gasket construction according to the invention has the advantage of providing a simple, but effective, solution for reinforcing the troublesome narrow region between the combustion opening and a closely adjacent coolant opening. The generally C-shaped armoring provides the needed reinforcement to provide a high integrity seal under high pressure, high temperature conditions. The armoring according to the invention avoids complicated bridges or other structure sometimes employed between adjacent combustion openings which involves removal of the narrow region in lieu of the bridge.

Another advantage of the present invention is that the armoring for the coolant opening can be formed as an extension of armoring used for the associated combustion opening, in a simple, cost-effective manner.

THE DRAWINGS

These and other objects, features and advantages of the invention will become more readily apparent when considered in connection with the following description and drawings, wherein:

FIG. 1 is a plan view of a gasket assembly constructed in accordance with this invention; and FIG. 2 is a sectional view taken generally along lines 2—2 of FIG. 1.

DETAILED DESCRIPTION

Referring now more particularly to the drawings, there is shown a gasket assembly 10 of this invention comprising a generally flat gasket body 12 for sealing communication between and engine block and a head (not shown).

The gasket body 12 has a plurality of combustion openings 14, 16, 18 and 20 and coolant openings 22 and 24. The coolant opening 22 is closely adjacent to but spaced from the combustion opening 14 to define a narrow, integral and contiguous region 26 of the material of the gasket body 12 between and separating the openings 14 and 22. The coolant opening 24 is closely adjacent to but spaced from the combustion opening 20 to define a similar narrow, integral and contiguous region 28 of the material of the gasket body 12 between the openings 20 and 24. However, the narrow region 28 of gasket material is partially obscured by armoring 30. Similar armoring will desirably be provided between the openings 14 and 22 but has been omitted to better illustrate the narrow region 26 of gasket material (which is like the region 28) between the openings 14 and 22.

The gasket body 12 preferably comprises a metallic core 32 and compressible fibrous facing sheets 34 on opposite sides of the metallic core.

The armoring 30 includes an inner armor layer 40 and an outer armor layer 42. The inner armor layer 40 has a generally C-shaped section 44 folded over an edge 45 of the combustion opening 20 adjacent to the coolant opening 24. The inner armor layer 40 has a top portion 46 extending from the top of the C-shaped section 44 and a bottom portion 48 extending from the bottom of the C-shaped section 44. The top and bottom portions 46 and 48 are parallel to one another and respectively extend over portions of the top and bottom surfaces 50 and 52 of the narrow region 28 of the gasket body adjacent to the edge 45 of the combustion opening 20, in surface-to-surface contact therewith.

The outer armor layer 42 has an outer C-shaped section 60 folded over the inner C-shaped section 44 of the inner armor layer 40 in surface-to-surface contact therewith. The outer armor layer 42 has a first top portion 62 extending from the top of the C-shaped section 60 and a bottom portion 64 extending from the bottom of the C-shaped section 60. The top and bottom portions 62 and 64 are parallel to one another and respectively extend over the top and bottom portions 46 and 48 of the inner armor layer 40, in surface-to-surface contact therewith. The top portion 62 of the outer armor layer 42 is shorter than the top portion 46 of the inner armor layer 40 as indicated by its terminal edge 66 which is short of the terminal edge 68 of the top portion 46 of the inner armor layer.

The bottom portion 64 of the outer armor layer 42 extends across the entire width of the bottom surface 52 of the narrow region 28 of the gasket body 12 and has a second C-shaped section 70 folded up and over an edge 72 of the coolant opening 24 adjacent to the combustion opening 20. The outer armor layer 42 has a second top portion 76 extending from the top of the second C-shaped section 70 over the top surface 50 of the narrow region 28 of the gasket body 12, overlapping and pressing down on the top portion 46 of the inner armor layer 40. The top portion 76 of the outer armor layer 42 has a terminal edge 78 closely adjacent to but spaced from the terminal edge 66 of the top portion 62 of the outer layer. The arrangement is such that both terminal edges 66 and 78 are closer to the edge 45 of the combustion opening 20 than to the edge 72 of the coolant opening.

The C-shaped section 70 prevents the gasket material in the narrow region 28 from extruding outward into the coolant opening 24 when exposed to extreme combustion pressure and "thermal push" loading. Also, by extending the top portion 76 of the outer armor layer 42 so that is overlaps the top portion 46 of the inner armor layer 40, a reinforced area adjacent to the seal along the combustion opening 20 is provided. This also provides a stiffer seal as well as "pinching" against the top portion 46 of the inner armor layer 40 to prevent it from pulling off the gasket material.

It will be seen from FIG. 1 that the second top portion 76 of the outer armor layer 42 has laterally spaced terminal edges 80, 82 terminating within the confines of the coolant opening 24 on laterally opposite sides of the narrow region 28, whereas the first top portion 62 extends circumferentially continuously about the combustion opening 20. Thus, while the combustion opening 20 is fully armored about its circumference, the adjacent coolant opening 24 is only partially armored along the narrow region 28 where the reinforcement is needed to withstand the pressures of the combustion gases in the combustion opening 20. The remainder of the coolant passage 24 defines an unarmored region 84 of the passage 24.

What is claimed is:

1. A gasket assembly comprising:
   a generally flat gasket body having a combustion opening and a coolant opening adjacent to but closely spaced from said combustion opening to define a narrow region of said gasket body between said openings, and
   armoring comprising a metallic armor layer having a generally C-shaped section folded over an edge of said coolant opening adjacent to said combustion opening and having ton and bottom portions extending from said C-shaped section over top and bottom surfaces of said narrow region of said gasket body with said top portion having laterally spaced terminal edges disposed along said coolant opening on laterally opposite sides of said narrow region of said gasket body.

2. A gasket assembly comprising:
   a generally flat gasket body having a combustion opening and a coolant opening adjacent to but closely spaced from said combustion opening to define a narrow region of said gasket body between said openings,
   armoring comprising a metallic inner armor layer having an inner generally C-shaped section folded over an edge of said combustion opening adjacent to said coolant opening,
   said inner armor layer having top and bottom portions extending from said inner generally C-shaped section respectively over top and bottom surfaces of said narrow region of said gasket body, and
   an outer metallic armor layer having an outer generally C-shaped section folded over said inner C-shaped section,
   said outer armor layer having top and bottom portions extending from said outer C-shaped respectively over the top and bottom portions of said inner armor layer,
   said bottom portion of said outer armor layer extending across the entire width of the bottom surface of said narrow region of said gasket body and having a second C-shaped section folded up and over an edge of said coolant opening adjacent to said combustion opening.

3. The gasket assembly of claim 2 wherein said outer armor layer has a second top portion extending from said second C-shaped section over the top surface of said narrow region of said gasket body and overlapping the top portion of said inner armor layer.

4. The gasket assembly of claim 3 wherein said second top portion of said outer layer has a terminal edge adjacent to a terminal edge of the first-mentioned top portion of said outer layer.

5. The gasket assembly of claim 2 wherein said outer armoring layer extends about only a portion of said coolant opening defined by said narrow region, with the remaining portion of said coolant opening being unarmored.

6. The gasket assembly of claim 2 wherein said outer armoring layer includes laterally spaced terminal edges disposed along said coolant opening on laterally opposite sides of said narrow region of said gasket body.

* * * * *

UNITED STATES PATENT AND TRADEMARK OFFICE
CERTIFICATE OF CORRECTION

PATENT NO. : 6,669,204 B2
DATED : December 30, 2003
INVENTOR(S) : Richard M. Larson It is certified that error appears in the above-identified patent and that said Letters Patent is hereby corrected as shown below:

<u>Column 3,</u>
Line 23, after "and having" please delete "ton" and insert therein -- top --.

Signed and Sealed this

Ninth Day of March, 2004

JON W. DUDAS
*Acting Director of the United States Patent and Trademark Office*